United States Patent [19]
Chaplin et al.

[11] Patent Number: 5,627,951
[45] Date of Patent: May 6, 1997

[54] GRAPHICAL DISPLAY OF CHROMA KEYER CONTROLS

[75] Inventors: Daniel J. Chaplin; Paul M. Trethewey, both of Nevada City; Paul S. Miller, Granite Bay, all of Calif.

[73] Assignee: Tektronix, Inc., Wilsonville, Oreg.

[21] Appl. No.: 395,233

[22] Filed: Feb. 27, 1995

[51] Int. Cl.⁶ .................................................. G06T 11/00
[52] U.S. Cl. .................................... 395/131; 395/326
[58] Field of Search ...................... 395/129–132, 395/126, 141, 155, 156, 159, 161; 358/500, 504, 516–523, 527, 537, 448, 452, 468

[56] References Cited

U.S. PATENT DOCUMENTS 5,254,977  10/1993  MacDonald ...................... 345/150
5,270,806  12/1993  Venable et al. .................... 358/500
5,313,304   5/1994  Chaplin ............................. 348/587

*Primary Examiner*—Almis R. Jankus
*Attorney, Agent, or Firm*—Francis I. Gray

[57] ABSTRACT

A graphic display for chroma keyer controls presents background hue as a radial spoke of an outer chroma vector circle, with selectivity being displayed as a wedge about the radial spoke. Foreground suppression may be added to the graphic display by providing a concentric inner chroma vector circle with the foreground suppression hue being a radial spoke of the inner circle and foreground selectivity being a wedge within the inner circle about such radial spoke. That portion of the outer circle that is overlapped by the inner circle is suppressed, or rendered invisible, so that the background chroma information appears as a torus about the inner chroma vector circle.

8 Claims, 3 Drawing Sheets

GRAPHICAL DISPLAY OF CHROMA KEYER CONTROLS

BACKGROUND OF THE INVENTION

The present invention relates to chroma keying, and more particularly to a graphic display for chroma keyer control which is intuitive for an operator.

A long standing problem with chroma keyers is how to distinguish different portions of a scene. An operator starts with a foreground scene that he wants to chroma key into a more or less unrelated background scene. But the foreground scene has a background portion and a foreground portion. The foreground portion is the part that is to be keyed into the new background scene. The background portion is usually a flat matte color, such as blue, which the chroma keyer operates on. As a result chroma keyers are complex functions with many controls. Such controls may be difficult to operate from an operator's perspective. The controls typically include knobs that are simply labeled by function, and which may include a numerical display of knob value. In a few cases a bar graph representation of the knob value may be displayed. However these controls are not very intuitive. The operator requires considerable skill to translate information displayed in this manner to develop an understanding of what the chroma keyer is doing.

What is desired is an intuitive display for conveying to an operator information about what a chroma keyer is doing as control knobs are manipulated.

SUMMARY OF THE INVENTION

Accordingly the present invention provides a graphic display for chroma keyer controls that readily conveys to an operator information about what the chroma keyer is doing in response to manipulation of the controls. A closed figure about a central point, such as a chroma vector circle, is displayed with angular position about the central point representing a hue angle, i.e., the color upon which the chroma keyer is operating. At appropriate intervals around the perimeter of the closed figure are letters indicating the hue angles for specific colors, such as the six standard color bar colors. Selectivity or sensitivity is indicated by an angular range about the hue angle, the width of the angular range indicating the selectivity. As a hue angle knob is rotated, a spoke rotates about the central point, and as a selectivity knob is rotated, a wedge representing the angular range about the hue angle line narrows or widens depending upon the direction of the rotation. Where both background and foreground portions of a scene are being manipulated by the chroma keyer, the foreground display may be a smaller concentric closed figure that overlaps the background display so that the background portion appears as a toms around the perimeter of the inner closed figure.

The objects, advantages and other novel features of the present invention are apparent from the following detailed description when read in conjunction with the appended claims and attached drawing.

DESCRIPTION OF THE PREFERRED EMBODIMENT

Figure 1:
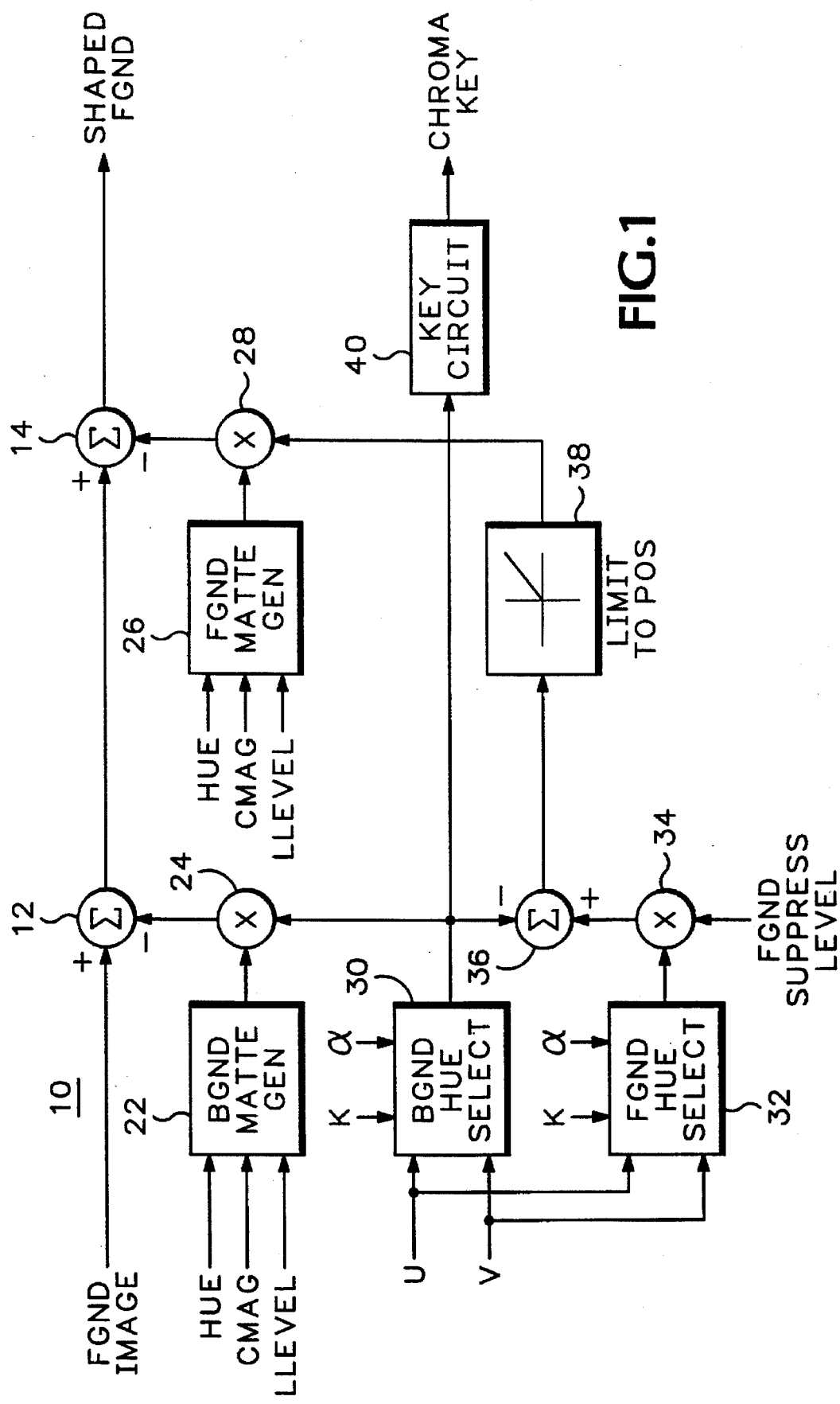
FIG. 1 is a block diagram view of a typical chroma keyer using a graphic display for chroma keyer control according to the present invention.

Referring now to FIG. 1 a typical chroma keyer 10 is shown having a foreground image input to a background suppression summation circuit 12, with the background suppressed foreground image then being input to a foreground suppression summation circuit 14 to produce a shaped foreground image. A background matte generator 22, having as inputs a hue signal, a chrominance magnitude signal and a luminance level signal, provides a background matte signal that is input to a background mixer 24. The output from the background mixer 24 is subtracted from the foreground image by the background suppression summation circuit 12. Likewise a foreground matte generator 26, having as inputs a hue signal, a chrominance magnitude signal and a luminance level signal, provides a foreground matte signal that is input to a foreground mixer 28. The output from the foreground mixer 28 is subtracted from the background suppressed foreground image by the foreground suppression summation circuit 14.

The chrominance components U, V of the foreground image, or of a reference image, are input to respective background and foreground hue selectors 30, 32, which also have as inputs a hue angle a and a sensitivity factor K. One example of the hue selectors is shown in FIG. 1 of U.S. Pat. No. 5,313,304 issued May 17, 1994 to Daniel J. Chaplin entitled "Chroma Keyer with Fringe Control Offset", incorporated herein by reference. A background hue select signal from the background hue selector 30 is input to the background mixer 24 for mixing with the background matte signal. A foreground hue select signal from the foreground hue selector 32 is input to a foreground suppress mixer 34 for mixing with a foreground suppression level signal. The resulting adjusted foreground hue select signal is input to a hue summation circuit 36 from which is subtracted the background hue select signal. The resulting hue select signal from the hue summation circuit 36 is limited to positive values by a limiter circuit 38 to prevent colors from being suppressed twice, and the limited hue select signal is input to the foreground mixer 28 for combination with the foreground matte signal. The background hue select signal also is input to a chroma keyer circuit 40 to produce a chroma key signal.

Figure 2:
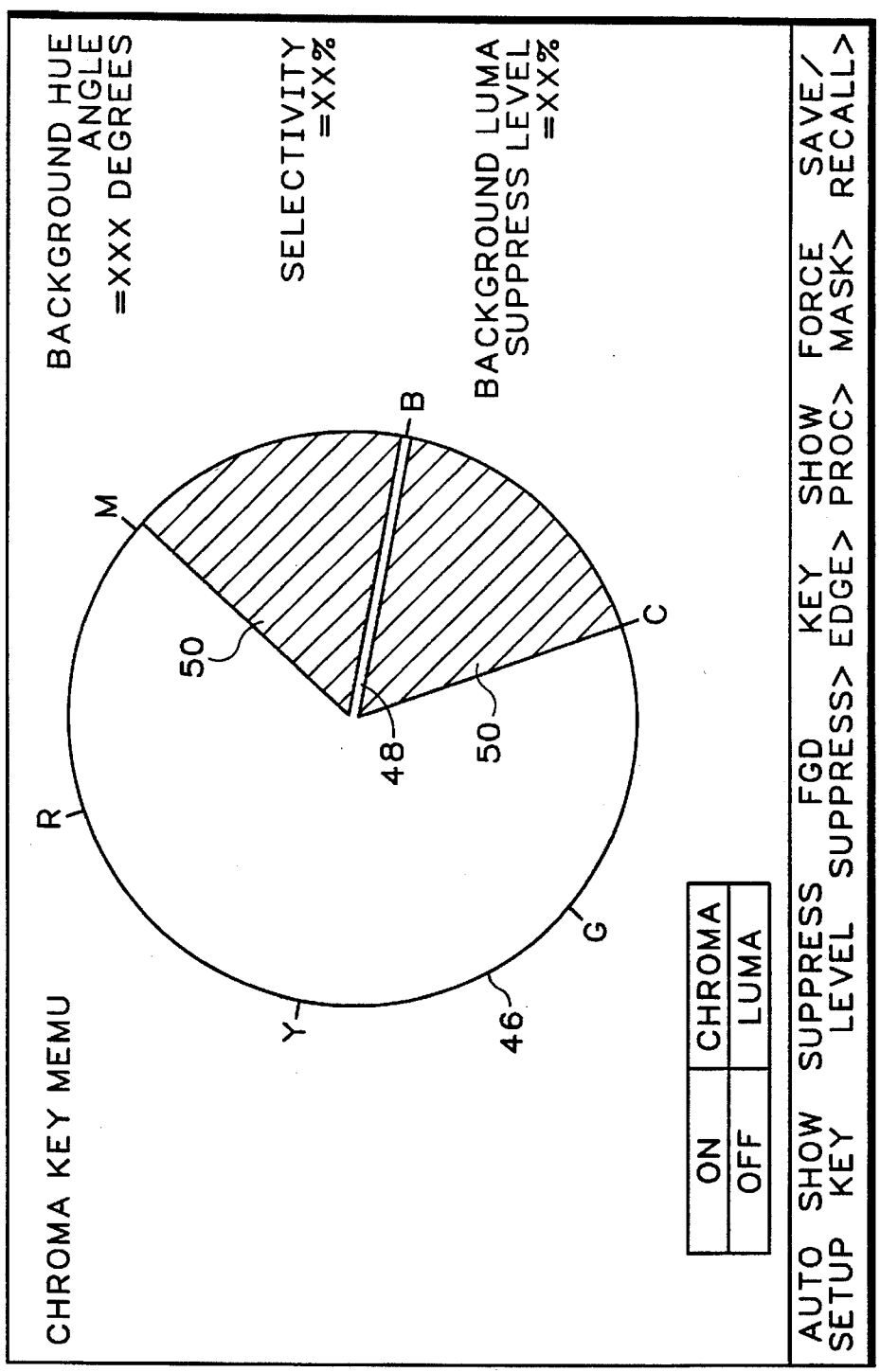
FIG. 2 is plan screen view of the graphic display for chroma keyer background control according to the present invention.
Figure 3:
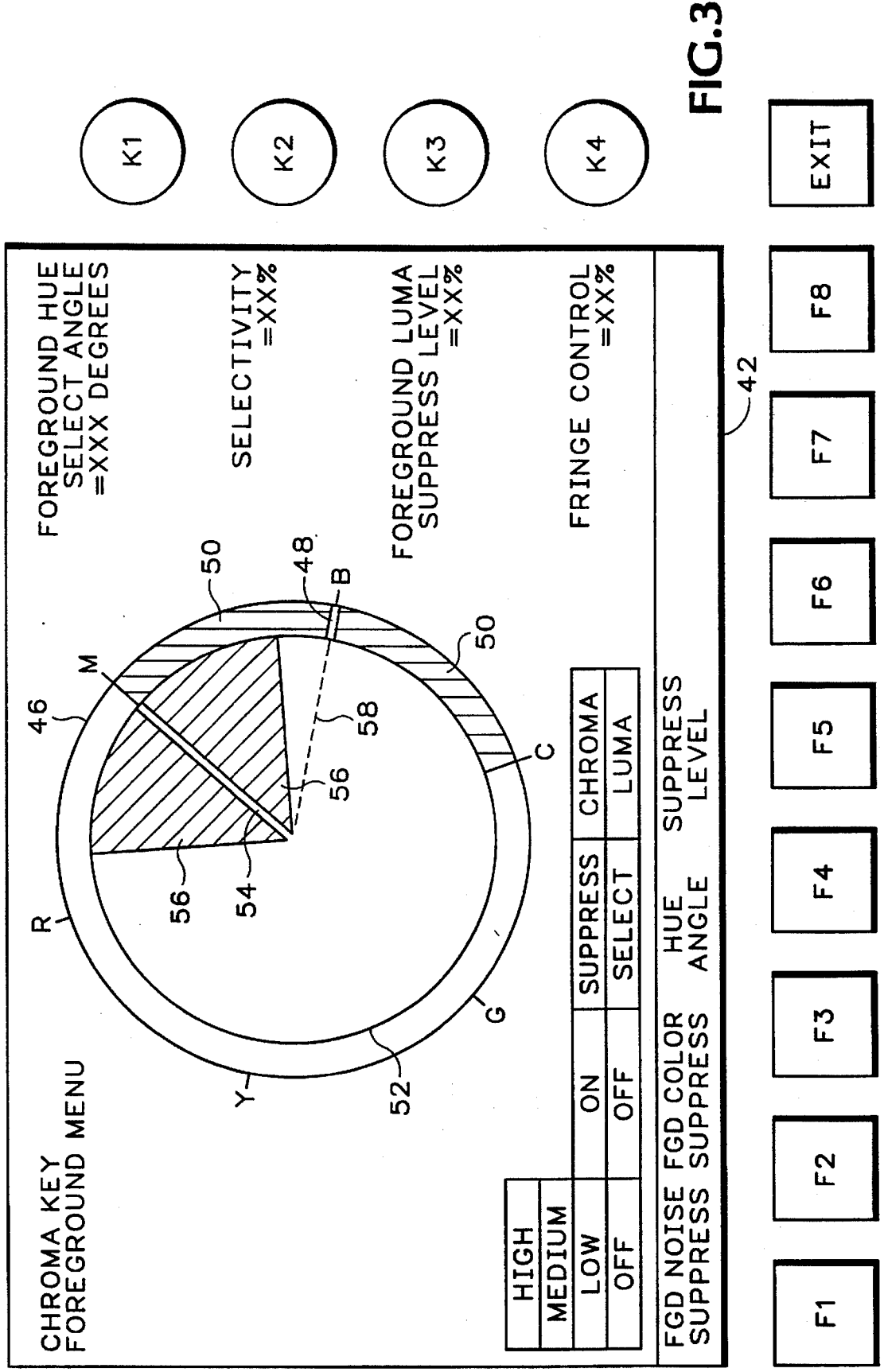
FIG. 3 is plan screen view of the graphic display for chroma keyer foreground control according to the present invention.

An interface is shown in FIGS. 2 and 3 that includes function keys F1–F8 below a graphic display 42 and control knobs K1–K4 to the right of the graphic display. A function legend for each active function key F1–F8 is displayed across the bottom of the graphic display 42. Each active control knob K1–K4 has a knob legend and current value being displayed along the right side of the graphic display 42. Current selection options for each active function key F1–F8 are displayed as stacks above the corresponding function legend. The selected option for each active function key F1–F8 is highlighted in some manner, as is well known in the art. The graphic display 42 includes a chroma vector circle 46 with the six standard color bar colors located by their appropriate letter about the circumference of the chroma vector circle, i.e., red R, yellow Y, green G, cyan C, blue B and magenta M. If a color display is used, as opposed to a monochrome display, the color around the chroma vector circle 46 may be indicated by a continuous color ring, like a rainbow. As shown in FIG. 2 a radial spoke 48 corresponds to a selected background hue angle and respective sectors 50, either colored or shaded, correspond to a selected sensitivity or selectivity. If the radial spoke 48 is colored, then the color may match the selected background hue angle. The sectors 50 may also be color shaded to display the color range or selectivity. To display also the foreground hue information as shown in FIG. 3 a concentric foreground chroma vector circle 52 is shown interior to the background chroma vector circle 46. A radial spoke 54 corresponds to the selected foreground hue angle and respective sectors 56, either colored or shaded preferably in contrast to the background sectors 50, correspond to the selected foreground sensitivity or selectivity. A dotted radial line 58 shows the extension of the truncated background hue radial spoke 48.

The dotted radial line 58 may also show a different knob position, such as FGD Hue Suppress Angle, where knob K1 may be either SELECT or SUPPRESS according to the state of the function key F3. When knob K3, FGD Hue Supress Level, is used, an operator may make adjustments to the hue of the foreground matte generator 26. Normally the hue of this matte generator 26 is locked to the background reference hue, i.e., knob K1 of FIG. 2. In this case the dotted line 58 lines up with the radial spoke 48. When the operator adjusts this knob K3, the dotted line 58 deviates from the radial spoke 48 to indicate (i) they are no longer aligned and (ii) the extent and direction of the correction.

In operation the operator has control of the foreground and background hue angles a and the respective selectivity values K via the knobs K1, K2 that are input to the hue selectors 30, 32. When the chroma key menu is accessed, a routine is executed that draws the menu title, fills in the function key legends, fills in the knob legends and values, draws the function key stacks and draws the chroma key graphics display 42. The chroma key graphics display 42 is created by drawing the outer chroma vector circle 46 with the six standard color bar characters around the perimeter. The chroma key primary hue and the background selectivity are used to generate the remainder of the display within the outer chroma vector circle 46. The background hue suppress angle is generated as the radial spoke 48, and then the sectors 50 about the radial spoke are filled in with the width being based upon the background selectivity. This display is continuously refreshed. When a change is made to one of the knobs K1, K2 controlling either hue angle or selectivity, a flag is set to indicate that there is a mismatch between the new values and the currently displayed values. A new radial spoke 48 is then drawn based upon the new hue angle, and/or the sector width is filled in based upon the new selectivity.

In the foreground suppress mode an inner chroma vector circle 52 also is drawn, with the inner wedge 56 about the foreground hue select angle and the width being determined by the foreground selectivity. The inner chroma vector circle 52 is drawn over the outer chroma vector circle 46 so that the portion of the outer chroma vector circle covered by the inner chroma vector circle is invisible, while the portion of the outer chroma vector circle between the inner and outer circle circumferences is visible. The chroma graphic display 42 is generated locally from the stored parameters fur hue and selectivity, while the knobs K1–K4 are monitored to detect whether there is any change in position. When the knobs K1–K4 indicate a change, the appropriate chroma key parameter is trimmed, any calculations required are performed, and the range of values is checked. If the chroma key parameter is visible, either because of being in the inner circle or between the inner and outer circle, the new knob value is appropriately displayed in the chroma graphic display 46 as well as being shown in the knob legend line. The new hue and selectivity values are stored locally so that the display may be refreshed until another knob movement occurs.

If separate knobs are available for asymmetric selectivity, a pair of wedges are generated independently about the radial spoke so that the resulting sector is not necessarily centered about the radial spoke. Further any graphic closed figure other than a chroma vector circle, such as a polygon, may be used so long as there is an arrangement of hue regions about a central point. Also the edges to the selectivity wedges may be softened rather than hard, and the wedges may have a non-uniform fill, such as color or grey scale variations as discussed above.

Thus the present invention provides a graphic display for chroma keyer controls that is intuitive to an operator by displaying a selected hue angle as a spoke from a central point within a closed figure, such as a chroma vector circle, and the selectivity as a wedge about the spoke, with both background and foreground portions of a scene being displayed as such closed figures, one superimposed inside the other.

What is claimed is:

1. A method of graphically displaying chroma keyer controls comprising the steps of:

drawing a first closed figure about a central point representing all values of hue for a background portion of a scene;

drawing a first spoke from the central point to the perimeter of the first closed figure at an angle representing a selected hue for the background portion according to a selected background hue input; and filling in a first wedge about the first spoke representing a selectivity for the background portion according to a selected background selectivity input.

2. The method of claim 1 further comprising the steps of:

drawing a second closed figure concentric with and interior to the first closed figure, the second closed figure representing all values of hue for a foreground portion of the scene;

drawing a second spoke within the second closed figure from the central point to the perimeter of the second closed figure at an angle representing a selected hue for the foreground portion according to a selected foreground hue input;

drawing a second wedge within the second closed figure about the second spoke representing a selectivity for the foreground portion according to a selected foreground selectivity input; and rendering invisible that portion of the first closed figure, spoke and wedge for the background portion that is overlapped by the second closed figure, spoke and wedge.

3. The method of claim 2 wherein the first and second closed figures comprise concentric chroma vector circles.

4. The method of claim 2 further comprising the step of representing the perimeter of the first and second closed figures as lines of continuously varying color where the color of the lines at a point of the perimeter corresponds to the color represented by the strobe from the central point to the perimeter point.

5. The method of claim 2 wherein the first and second wedges each comprise a sector of varying shade from one angular edge to the other.

6. The method of claim 1 wherein the first closed figure comprises a chroma vector circle.

7. The method of claim 1 further comprising the step of representing the perimeter of the first closed figure as a line of continuously varying color where the color of the line at a point of the perimeter corresponds to the color represented by the first strobe from the cental point to the perimeter point.

8. The method of claim 1 wherein the first wedge comprises a sector of varying shade from one angular edge to the other.

* * * * *